(12) United States Patent
Gallagher et al.

(10) Patent No.: US 10,204,264 B1
(45) Date of Patent: Feb. 12, 2019

(54) SYSTEMS AND METHODS FOR DYNAMICALLY SCORING IMPLICIT USER INTERACTION

(71) Applicant: Google Inc., Mountain View, CA (US)

(72) Inventors: Andrew Gallagher, Mountain View, CA (US); Utsav Prabhu, Mountain View, CA (US)

(73) Assignee: Google LLC, Mountain View, CA (US)

( * ) Notice: Subject to any disclaimer, the term of this patent is extended or adjusted under 35 U.S.C. 154(b) by 31 days.

(21) Appl. No.: 15/369,832

(22) Filed: Dec. 5, 2016

(51) Int. Cl.
*G06K 9/00* (2006.01)
*G06F 17/27* (2006.01)
*H04N 21/442* (2011.01)
*H04N 21/466* (2011.01)

(52) U.S. Cl.
CPC ..... *G06K 9/00302* (2013.01); *G06F 17/2785* (2013.01); *G06K 9/0061* (2013.01); *G06K 9/00255* (2013.01); *G06K 9/00288* (2013.01); *H04N 21/44218* (2013.01); *H04N 21/4667* (2013.01)

(58) Field of Classification Search
CPC .......... G06K 9/00302; G06K 9/00255; G06K 9/0061; G06F 17/2785; H04N 21/44218; H04N 21/4667
See application file for complete search history.

(56) References Cited

U.S. PATENT DOCUMENTS

2016/0191995 A1* 6/2016 el Kaliouby ........... A61B 5/165
   725/12
2017/0255010 A1* 9/2017 Yamamoto ........ H04M 1/72563

\* cited by examiner

*Primary Examiner* — Nirav G Patel
(74) *Attorney, Agent, or Firm* — Foley & Lardner LLP

(57) ABSTRACT

A method of dynamically scoring implicit interactions can include receiving, by an interaction analysis server from an imaging system, a plurality of images of an environment captured in a period of time corresponding to display of a presentation, retrieving, by the interaction analysis server, content information corresponding to content of the presentation, and identifying, by a presence detector of the interaction analysis server, that a face appears in at least one image of the plurality of images. The method can further include matching, by a facial recognition system of the interaction analysis server, the face with a user identifier, retrieving, by a client device information retriever, client device information associated with the user identifier and corresponding to the period of time, and calculating, by a client device interaction score calculator, a client device interaction score based on one or more correspondences between the client device information and the content information.

19 Claims, 4 Drawing Sheets

Method for calculating an interaction score with reduced use of computer resources 400

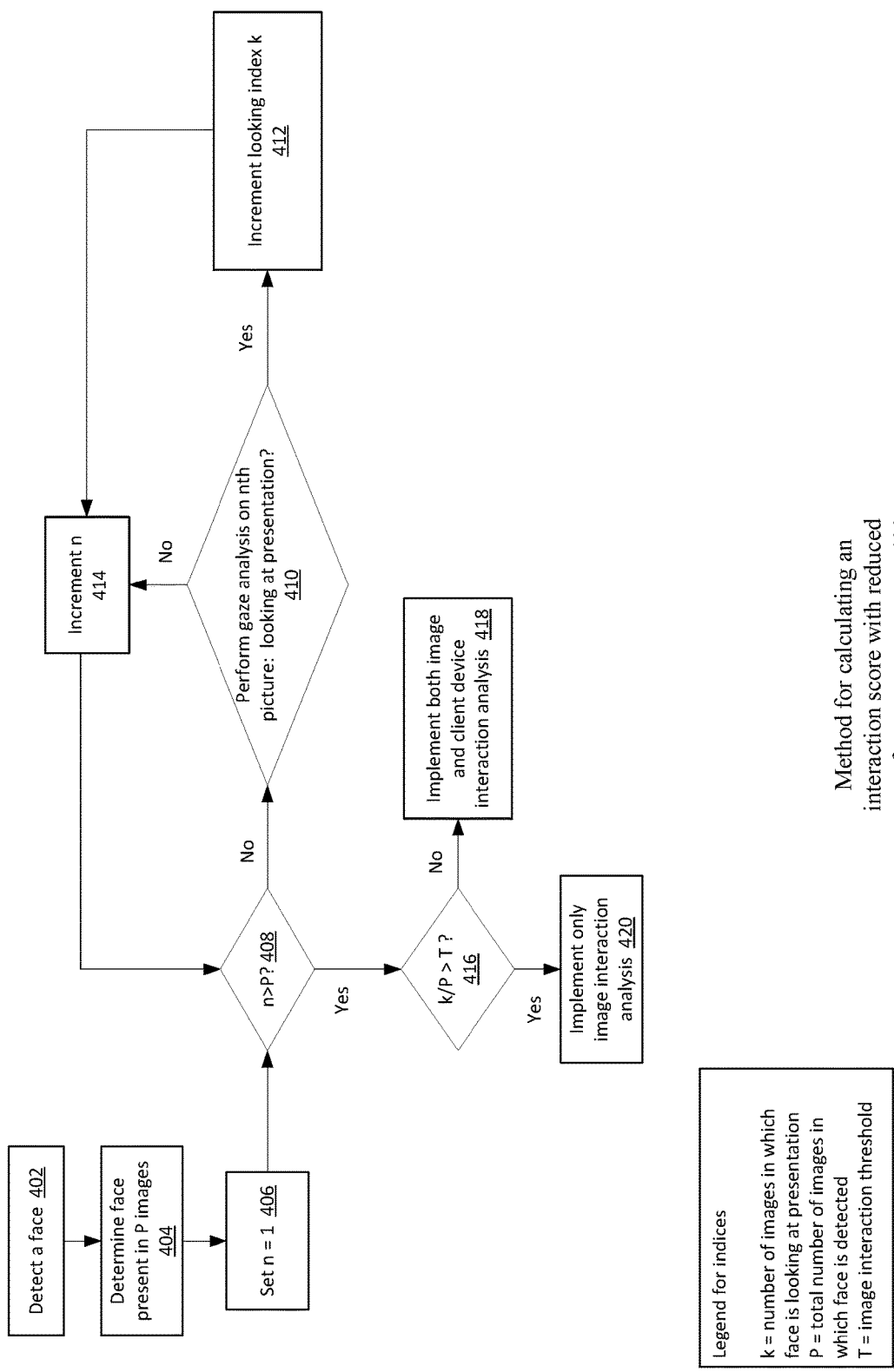

SYSTEMS AND METHODS FOR DYNAMICALLY SCORING IMPLICIT USER INTERACTION

BACKGROUND

While watching a presentation, a person's attention level may vary. Attention levels may vary for an individual person over the duration of the presentation, and attention levels may vary between individuals of a group of individuals watching or present at a presentation. Absent explicit engagement indicators, such as requiring individuals to periodically interact with a control, it may be difficult to distinguish attention and inattention.

SUMMARY

It can be difficult for an automated system to estimate the level of attention a person is paying to a presentation, because many indicators are subjective or implicit. One such method of estimating a person's level of attention is to use an imaging system to capture images of the person during the presentation and to estimate the attention level based on whether the person is looking at the presentation. A model for calculating attention levels might interpret a person looking at a presentation of content, such as on a display of a television (TV), as having a high level of attention toward the presented content, and a person not looking at the display as having a low level of attention toward the presented content.

However, such an assumption may fail to capture a person's true attention level. A person might look away from a presentation of content to more fully engage themselves in the content by using a client device to, e.g., discuss the presentation on social media or search for information related to the presented content. A model as described above would interpret a person looking away from the presentation to discuss the presentation on social media as a person being disinterested, when in fact the opposite is true: the person is likely highly engaged with the content. Thus, automated systems such as the above may be prone to false negatives or false positives, and make take further steps incorrectly based on the false negatives or false positives (e.g. supply additional content that a user is not interested in, wasting bandwidth and increasing user frustration; skip past content a user is interested in, frustrating the user and potentially requiring additional user interactions to resume or reply the skipped content.

Systems and methods described herein can remedy the failings of the above-described models by accounting for a client device interaction level that can dynamically score implicit user interactions to estimate attention level based on the user's interactions with a client device. A person discussing the presented content on social media, or making search queries on a client device that are topically related to the presented content, are likely highly interested in the content. The client device interaction level can be used in a model that properly takes this into account. The client device interaction level can be incorporated into a calculation of an overall interaction score that better captures a person's interaction level towards a presentation. By tracking interaction levels across multiple systems, such as an imaging system and a client device, a better measurement of a person's attention level can be achieved, reducing or avoiding false positives and negatives and potentially saving content delivery bandwidth, eliminating erroneously cached data, and otherwise increasing the efficiency of the system.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

FIG. 4 is a flowchart depicting some implementations of a method of calculating an interaction score with reduced use of computer resources.

It will be recognized that some or all the figures are schematic representations for purposes of illustration. The figures are provided to illustrate one or more embodiments with the explicit understanding that they will not be used to limit the scope or the meaning of the claims.

DETAILED DESCRIPTION

Following below are more detailed descriptions of various concepts related to, and implementations of, methods, apparatuses, and systems for determining an interaction level. The various concepts introduced above and discussed in greater detail below may be implemented in any of numerous ways as the described concepts are not limited to any particular manner of implementation. Specific implementations and applications are described primarily for illustrative purposes.

The present application is generally directed to systems and methods for determining an interaction level. The systems and methods described herein can be employed in any environment in which a presentation is made and in which an imaging system can be implemented. In one implementation, the systems and methods described herein can be employed in a room in which a screen displaying content, a camera, and at least one person are present, such as a living room in which some people are sitting around a television displaying content, the television including a camera (e.g. a camera mounted on the television or integrally included in the television). The systems and methods described herein can also or alternatively be employed to determine an interaction level of an individual person using a laptop on which content is displayed, the laptop including a webcam. The systems and methods described herein can also or alternatively be employed in a classroom or boardroom setting in which a person is making a presentation, and in which an imaging system such as a video camera is employed to capture one or more images of people present in the classroom or boardroom. Analysis can be performed on images captured by the imaging system to determine an interaction level for an individual present in the environment in which the presentation was made, the analysis based on an image interaction analysis and a client device interaction analysis. The image interaction analysis can include an analysis of a gaze of the individual captured in the image, and a client device interaction analysis can include an analysis of information related to a client device associated with the individual.

Figure 1:
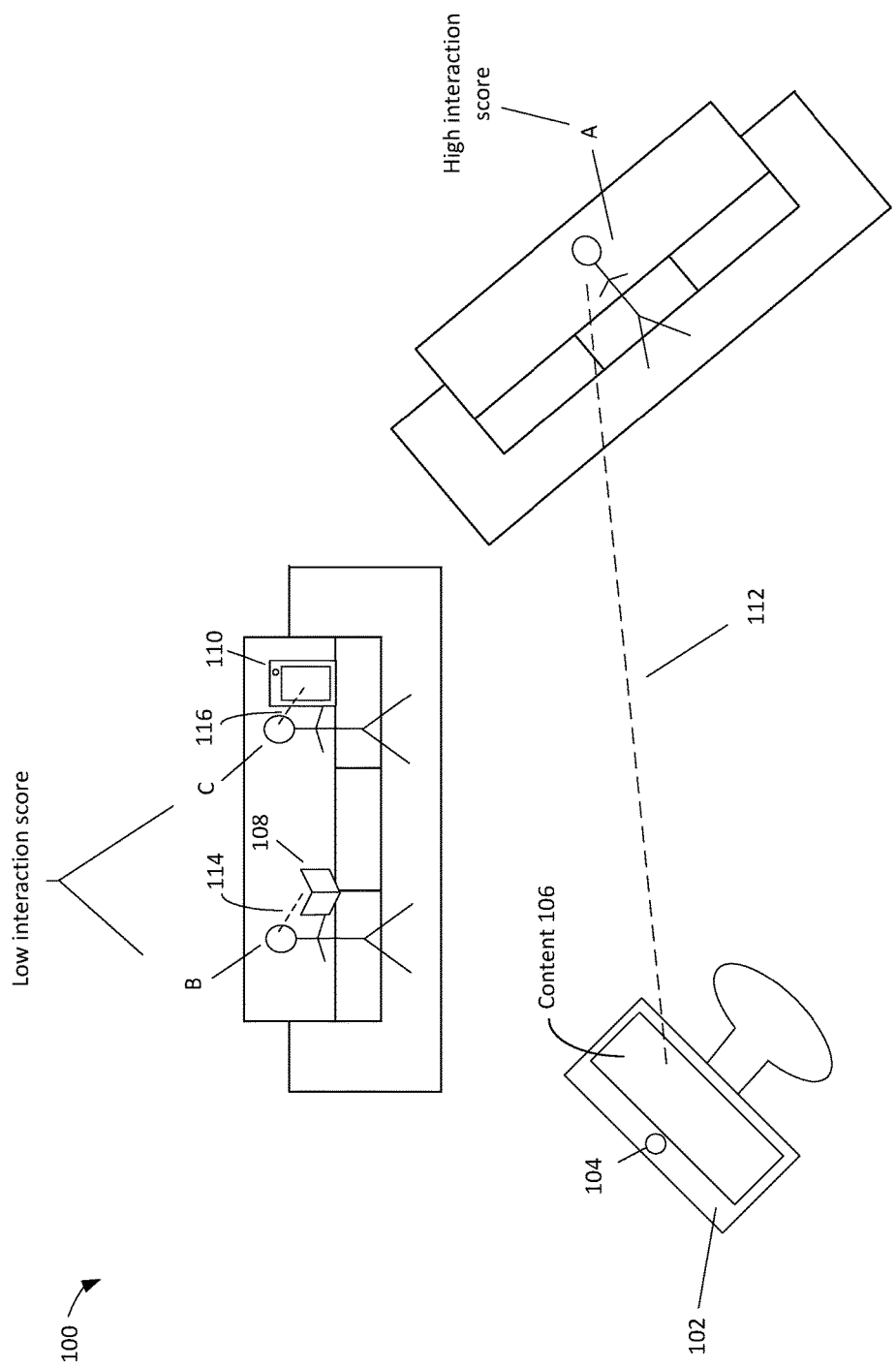
FIG. 1 depicts an environment in which content is being presented and in which people are paying varying levels of attention to the presentation.

FIG. 1 depicts an environment in which content is being presented and in which people are paying varying levels of attention to the presentation. The system 100 can include a television 102, a camera 104, and a client device 110. The system 100 can also include an interaction analysis server and a network (not shown), such as an interaction analysis server 204 and a network 208 described below in reference to FIG. 2.

FIG. 1 depicts a person A, a person B, and a person C in a room with the television 102. The television 102 is presenting content 106. Person A is looking at the content 106, as shown by person A's gaze 112. Person B is looking at a book 108, as shown by person B's gaze 114. Person C is looking at the client device 110, as shown by person C's gaze 116.

In the depicted implementation, the camera 104 can capture one or more images of persons A-C, and an interaction analysis server can determine based on the images where each person's gaze is directed, and can assign an image interaction score to each person based on the gaze of the person and a known or inferred location of the television 102. Higher interaction scores can be assigned to people gazing at the television 102, as that can be indicative that a person is paying attention to the content 106 presented by the television 102. Person A can be assigned a high image interaction score based on their gaze 112 being directed toward the content 106 presented on a display of the television 102. Persons B and C can be assigned low image interaction scores based on their respective gazes 114 and 116 being directed toward the book 108 and the client device 110, respectively.

However, the assigned image interaction scores may not be accurate measures of the attention each person is paying to the presented content 106. In one such instance, persons B and C may be assigned low interaction scores because their gazes are not directed to the television 102. In the depicted scenario, person B is reading the book 108 and is in fact not paying attention to the presented content 106. Thus, for person B a low interaction score may be an accurate measure of the attention person B is paying to the presented content 106. However, despite not looking at the presented content 106, person C might be paying close attention to the presented content 106, and may, at the time the camera 104 captured images of person C, have been using the client device 110 to access or generate online content related to the presented content 106. If the presented content 106 is a televised tennis match, person C may be using the client device 110 to search online for tennis player statistics, or person C may be posting about the tennis match on social media. In such a situation, person C may be assigned a low image interaction score which does not accurately reflect the high level of attention person C is paying to the presented content 106. The systems and methods described herein for determining an attention level can be used to calculate and assign a more accurate interaction score to person C by retrieving information related to person C's use of the client device 110 and determining if the use is related to the presented content 106, thus indicating that person C is paying at least some attention to the presented content 106.

In some implementations, if a user is accurately determined to be uninterested in and not interacting with a presentation, some content delivery may be skipped, thus preserving bandwidth and battery life on a user device that is displaying the presentation. In some implementations, such as those described with respect to FIG. 4, an initial, partial interaction analysis is performed to determine how effective an image analysis will be based on a number of images that include a face of interest. If the initial analysis detects that image analysis will be effective (based on detecting a large number of images that include the face of interest), than only an image-based analysis is performed, thus conserving computing resources. Otherwise, a full analysis is performed, including a client device interaction analysis.

Figure 2:
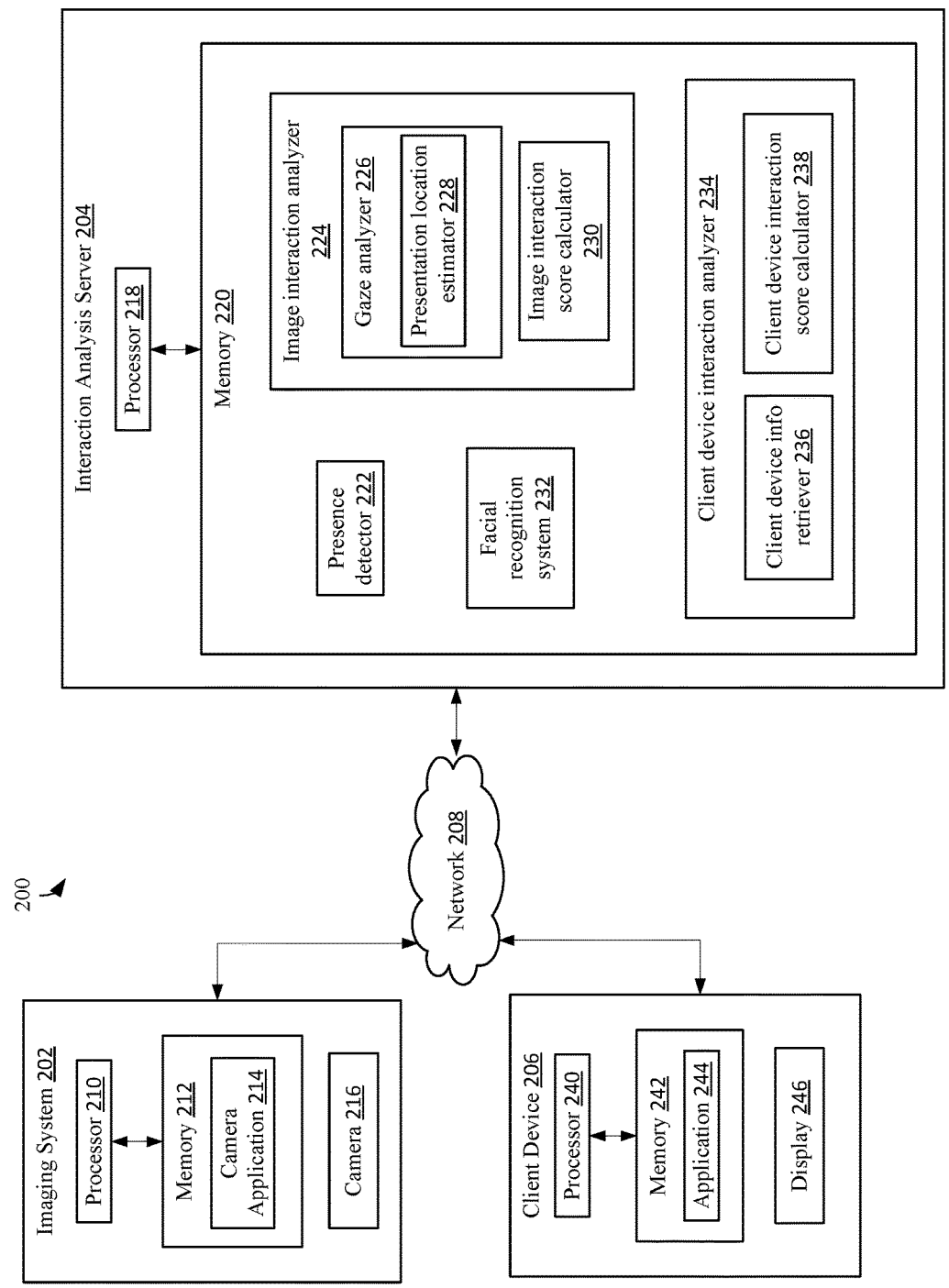
FIG. 2 is a block diagram depicting some implementations of a system for determining an interaction score.

FIG. 2 is a block diagram depicting an implementation of a system 200 for determining an interaction level. The system 200 may comprise an imaging system 202, an interaction analysis server 204, and one or more client devices 206 (which may be referred to herein as "the client device 206"), each of which can communicate via one or more networks 208 with at least one other device of the system 200. In some implementations, the network 208 may include a LAN network, a Wi-Fi network, a cellular network, a wide area network (WAN), a telephone network, such as the Public Switched Telephone Network (PSTN), a wireless link, a satellite link, a device-to-device mesh network, an intranet, the Internet, or combinations thereof.

Referring to the imaging system 202 in more detail, in some implementations, the imaging system 202 can include one or more data processors 210 (referred to herein as "the processor 210"), a memory 212, and a camera 216. The one or more data processors 210 can be configured to execute instructions stored in the memory 212 to perform one or more operations described herein. The memory 212 may be one or more memory devices. In some implementations, the processor 210 and the memory 212 of imaging system 202 may form a processing module. The processor 210 may include a microprocessor, an application-specific integrated circuit (ASIC), a field-programmable gate array (FPGA), etc., or combinations thereof. The memory 212 may include, but is not limited to, electronic, optical, magnetic, or any other storage or transmission device capable of providing processor with program instructions. The memory 212 may include a floppy disk, compact disc read-only memory (CD-ROM), digital versatile disc (DVD), magnetic disk, memory chip, read-only memory (ROM), random-access memory (RAM), Electrically Erasable Programmable Read-Only Memory (EEPROM), erasable programmable read only memory (EPROM), flash memory, optical media, or any other suitable memory from which processor can read instructions. The instructions may include code from any suitable computer programming language such as, but not limited to, C, C++, C#, Java®, JavaScript®, Perl®, HTML, XML, Python®, and Visual Basic®. The processor 210 may process instructions for capturing images via the camera 216.

In some implementations, the imaging system 202 can include one or more cameras 216, which can be any device that can record images, including cameras, video-cameras, webcams, mobile phone cameras, or television-mounted cameras. The cameras can include red-green-blue (RGB) cameras, which may be well-suited to capturing detailed images in well-lit environments, and/or infrared cameras, which may be well-suited to capturing images in low lighting environments.

In some implementations, a camera 216 of the imaging system 202 can be positioned in an environment where a presentation is displayed (e.g. at a predetermined location) such that it is likely to capture a face watching the presentation. In some implementations, the imaging system 202 can include a camera 216 mounted on a TV screen facing viewers of the TV, as depicted in FIG. 1, or can be mounted on a stage behind or above a podium at which a speaker will be speaking. The imaging system 202 can include a plurality of cameras 216. A plurality of cameras 216 can be positioned such that, together, they cover a wide field of view that includes a likely position of an audience (e.g. a majority of seats available to an audience of the presentation).

In some implementations, a position where a presentation will be made, such as a location of a TV or of a speaker at an event, can be predetermined. In some implementations, the imaging system 202 or the interaction analysis server 204 can store information that corresponds to a position of a display of an electronic device or a position of a speaker giving a presentation (e.g. a location of a podium or a seat in a boardroom) relative to one or more cameras of the imaging system 202. In some implementations, this information can be stored in the memory 212 of the imaging system 202 via user input with the imaging system 202, or via a location sensing device positioned at or near the presentation. The imaging system 202 can transmit this information over a network 208 via a network interface of the imaging system 202 to the interaction analysis server 204, or the information can be retrieved from a local memory store by the interaction analysis server 204, and can be used to determine whether a gaze of a person captured in an image by the camera of the imaging system 202 is directed toward the presentation. In other implementations, the location of the presentation may not be predetermined, and may be determined by the analysis server based on location information transmitted by another device connected to the network 208. In one such instance, a presenter may wear a radio tag that transmits location information to the imaging system 202 (for future transmittal to the interaction analysis server 204) or to the interaction analysis server 204.

In some implementations, a camera application 214 can be installed on the imaging system. The camera application 214 can include one or more applications, services, routines, servers, daemons, or other executable logics for capturing one or more images of one or more viewers watching a presentation by instructing the camera 216 to capture images. The camera application 214 can capture images, e.g., at timed intervals. The camera application 214 can capture images (e.g. continuously, at timed intervals, and/or based on triggering events detected by the camera application 214, such as a sudden and significant change in the environment being recorded) through a period of time corresponding to the time during which the presentation is displayed. In one implementation, the camera application 214 can capture images for the full duration of the presentation. The camera application 214 can additionally capture images for some predetermined time prior to and/or after the display of the presentation. In other implementations, the camera application 214 can capture images for during a period of time less than the full duration of the presentation. In some implementations, the camera application 214 can begin capturing images when manually instructed to do so, via, in some implementations, pressing a "record" button of the camera 216, or via an interaction with a graphical user interface (GUI) caused to be presented on a display of the imaging system 202 by the camera application 214.

In some implementations, the imaging system 202 can include a location self-monitoring system. In some implementations, the camera 216 of the imaging system 202 can be equipped with a transmitter than pings a plurality of stations located nearby to determine its position relative to the stations via, e.g., triangulation. The camera self-location information can be used by the interaction analysis server 204 in conjunction with a known or estimated location of the presentation (e.g. estimated by a presentation location estimator of the interaction analysis server 204, described in more detail below) to determine whether a person captured in an image by the imaging system 202 is looking at the presentation or not.

In some implementations, the imaging system 202 can be communicatively coupled to the network 208 via, in various implementations, a Wi-Fi, Bluetooth, Ethernet, or other connection. The imaging system 202 can be configured to transmit information, such as captured images and/or metadata related to the captured images (e.g. timestamps or camera position information), to the interaction analysis server 204 via the network 208.

Referring to the interaction analysis server 204 in more detail, the interaction analysis server 204 can include one or more data processors 218 configured to execute instructions stored in a memory 220 to perform one or more operations described herein. The memory 220 may be one or more memory devices. In some implementations, the processor 218 and the memory 220 of the interaction analysis server 204 may form a processing module. The processor 218 may include a microprocessor, an application-specific integrated circuit (ASIC), a field-programmable gate array (FPGA), etc., or combinations thereof. The memory 220 may include, but is not limited to, electronic, optical, magnetic, or any other storage or transmission device capable of providing processor with program instructions. The memory 220 may include a floppy disk, compact disc read-only memory (CD-ROM), digital versatile disc (DVD), magnetic disk, memory chip, read-only memory (ROM), random-access memory (RAM), Electrically Erasable Programmable Read-Only Memory (EEPROM), erasable programmable read only memory (EPROM), flash memory, optical media, or any other suitable memory from which processor can read instructions. The instructions may include code from any suitable computer programming language such as, but not limited to, C, C++, C#, Java®, JavaScript®, Perl®, HTML, XML, Python®, and Visual Basic®. The processor 218 may process instructions and output data to calculate an interaction score.

In some implementations, the interaction analysis server 204 may include one or more applications, services, routines, servers, daemons, or other executable logics for determining an attention level of a person toward a presentation. These applications, services, routines, servers, daemons, or other executable logics may be integrated such that they may communicate with one another or be enabled to make calls to routines of each other. In some implementations, these applications, services, routines, servers, daemons, or other executable logics may include a presence detector 222, an image interaction analyzer 224, a facial recognition system 232, and a client device interaction analyzer 234. In some implementations, the interaction analysis server 204 can receive image data from the imaging system 202 via the network 208, and can analyze the received data to calculate one or more interaction scores.

In some implementations, presence detector 222 can include one or more applications, services, routines, servers, daemons, or other executable logics for detecting one or more people included in an image. The presence detector 222 can include a face detector application that can analyze an image to detect faces of people included in the image. The presence detector 222 may use facial recognition techniques to detect faces. In some implementations, the presence detector 222 may use template matching methods that can involve detecting faces by correlating pixels of the image with a standard template face pattern. The presence detector 222 may use a color segmentation approach that can involve detecting a patch of skin-colored pixels in the image. The presence detector 222 may use a feature invariant technique, such as a technique based on facial landmarks (such as the corner of a mouth, an eye, a nose, and/or distances and angles therebetween). The presence detector 222 might parse the image data and detect one or more sets of pixels that correspond to facial landmarks. In some implementations, the image data received from the imaging system 202 can include a plurality of images that can be ordered chronologically by the imaging system 202 or by the interaction analysis server 204 (e.g., based on image timing data or time stamps received from the imaging system 202), and the presence detector 222 can track a set of facial landmark pixels through the chronologically ordered images to establish the presence of a face. In other implementations, other face detection techniques may be used. Any of these face detection techniques may be used individually or in combination with one or more other face detection techniques.

In some implementations, the presence detector 222 can detect a feature associated with a detected face, such as an emotional feature. In some implementations, the presence detector 222 can detect that a face is smiling based on facial landmarks. Such a feature may be used by the image interaction analyzer 224 or the client device interaction analyzer 234 to calculate an interaction level. In some implementations, a lack of detected emotional features may be determined to correspond to a lower interaction level. In other implementations, the presentation may be annotated with expected emotions at various points in time during the presentation, and the interaction analysis server 204 may determine that a person is paying attention to the presentation based on a correspondence between the emotions detected by the presence detector 222 and the annotated expected emotions.

In other implementations, the presence detector 222 can detect the presence of one or more people using techniques other than face detection. In some implementations, the presence of one or more people can be detected using convolution neural network techniques, such as techniques involving region-based convolution neural networks (R-CNN), or fast region-based convolution neural networks (Fast R-CNN). In some implementations, the presence detector might receive via the network 208 an indication that a person is present in a location associated with the image. The indication may be received either directly or indirectly, from a device associated with a person, the device having global positioning system (GPS) functionality, or from an application installed on the device that transmits information indicating that the person has self-reported that they are present at the presentation, or are present at a presentation that is associated by the interaction analysis server 204 with the presentation. Any of these techniques can be used in combination with each other and/or with the face detection techniques described above.

In some implementations, the image interaction analyzer 224 can include one or more applications, services, routines, servers, daemons, or other executable logics for calculating, for one or more people, an interaction level toward a presentation based on analysis of an image captured by the imaging system 202. The image interaction analyzer 224 can include a gaze analyzer 226, and an image interaction score calculator 230.

In some implementations, the gaze analyzer 226 can include one or more applications, services, routines, servers, daemons, or other executable logics for analyzing an image which includes a person to determine a direction of the person's gaze (e.g. determining a "viewing direction," which can be a vector corresponding to a direction in which the person is looking and having an origin point at a person's eye or eyes). The gaze analyzer 226 can perform any appropriate gaze detection technique individually or in combination with other gaze detection techniques. The gaze analyzer 226 can analyze a head pose of an imaged person to determine a direction of the person's gaze. In some implementations, the gaze analyzer 226 can determine a person's gaze to be a vector orthogonal to a plane that approximately represents a person's face, in a direction towards the location of the presentation, the vector being in a two or three dimensional space that models an environment in which the person and the presentation are located. The plane that represents the person's face may be located by the presence detector 222 using any of the face detection techniques described above, such as by detection of facial landmarks, or any other appropriate technique.

In some implementations, in addition to or independently of the head pose analysis, the gaze analyzer 226 can determine an imaged person's gaze by analyzing pixels that correspond to the person's eye. The presence detector 222 might identify a face in an image, and the gaze analyzer 226 can detect an eye of the face by searching for pixels that correspond to the white or light-colored sclera of the person's eye. The gaze analyzer 226 can further detect a pupil or iris of the eye by searching for a patch of darker-colored pixels in the patch of sclera pixels. The gaze analyzer 226 can determine a direction of the persons gaze based on the detected location of the iris and pupil. In an implementation, if the iris or pupil is to the person's left side of the eye, the person can be determined to be looking to their left. The gaze analyzer 226 can estimate a gaze direction based on head pose analysis, and can refine that estimate based on eye pixel analysis. In some implementations, the gaze analyzer 226 can perform gaze analysis using eye tracking techniques that make use of CNNs. The eye tracking techniques can include corneal-reflection-based methods (which may rely on external light sources reflecting off the cornea to detect eye features), shape-based methods (which may infer gaze direction from observed eye shapes, such as pupil center and iris edges), and/or appearance-based or view-based methods which map an image of an eye to a higher-dimensional space and perform analysis therein.

In some implementations, the gaze analyzer 226 can include a presentation location estimator 228. The presentation location estimator 228 can include one or more applications, services, routines, servers, daemons, or other executable logics for estimating a location of a presentation based on gaze analysis of one or more people in an image. The presentation location estimator 228 can determine the location of the presentation to where one or more people captured in an image are looking.

In some implementations, the gaze analyzer 226 can estimate a location of a presentation to be in an area or volume within a two or three dimensional space that models an environment in which the presentation, and possibly the people, are located. The presentation location estimator 228 can estimate a direction of a respective gaze for each of a plurality of people in an image. The presentation location estimator 228 (and/or the presence detector 222) can further determine a position of each person's respective face or eye. The presentation location estimator 228 might determine a gaze vector to represent each person's gaze, the gaze vector originating at a person's eye. The presentation location estimator 228 might identify an area or volume of the model space (such as a predetermined area or volume, that might correspond to a size of a presenter, or might correspond to a typical screen size of a device for displaying content), in which a gaze vector density is above a predetermined threshold, or in which the gaze vector density is highest for the model space. The presentation location estimator 228 can flag this area or volume as corresponding to a location of a presentation. The gaze analyzer 226 can then determine, for each imaged person, whether the person's gaze is directed at (e.g. intersects or nearly intersects) the area or volume corresponding to the presentation to determine if the person is looking at the presentation. In other implementations, as described above, the location of the presentation is predetermined, and the gaze analyzer 226 can identify an area or volume within the two or three dimensional space that corresponds to the predetermined location of the presentation. The gaze analyzer 226 can then identify, for each person, whether the person's gaze is directed to the area or volume corresponding to the presentation.

In some implementations, the image interaction score calculator 230 can include one or more applications, services, routines, servers, daemons, or other executable logics for calculating an image interaction score based on analysis of an image. As described above, the imaging system 202 can capture an image including people and can transmit data corresponding to the image, via the network 208, to the interaction analysis server 204. The gaze analyzer 226 can determine a gaze (e.g. a gaze vector) for each person in the image. The gaze analyzer 226 can determine, based on a predetermined location of the presentation, or based on a location of the presentation estimated by the presentation location estimator 228, whether the person or people captured in the image are looking at the presentation. The image interaction score calculator 230 can calculate, based on any of these determinations, an image interaction score for an imaged person that may be indicative of an attention level of the person toward the presentation.

In some implementations, the image interaction score calculator 230 can analyze a plurality of images received from the imaging system 202, each image corresponding to a time falling within a time period of display of the presentation. The image interaction score calculator 230 can instruct a facial recognition system 232 (described in more detail below), such as a face matching application, to determine whether a face detected by the presence detector 222 in a first image of the set of images is a same face as a face detected by the presence detector 222 in a second image of the set of images. In other words, the image interaction score calculator 230 can instruct the facial recognition system 232 to identify a same person across a plurality of images of the set of images. In some implementations, for a person identified in a plurality of images of the set of images, the image interaction score calculator 230 can instruct the gaze analyzer 226 to perform gaze analysis on each image in which the person is identified, and to determine whether the identified person's gaze is directed to the presentation in each image. The image interaction score calculator 230 can thereby determine a total number of images in which the identified person is looking at the presentation. The image interaction score calculator 230 can calculate an image interaction score based on this number. In some implementations, the image interaction score calculator 230 can calculate and assign to the identified person a score equal to a percentage of images, of the set of images, in which the person's gaze was directed to the presentation. In other implementations, image interaction score calculator 230 can calculate and assign to the identified person a score equal to a percentage of images, of the images in which the person was identified, in which the person's gaze as directed to the presentation. The image interaction score calculator 230 can calculate and assign a score in any appropriate manner, based on the number of images in which the identified person's gaze was directed to the presentation. The image interaction score calculator 230 can perform these calculations for any person captured in any image of the set of images.

In other implementations, the image interaction score calculator 230 can calculate an image interaction score based on analysis of the set of images other than gaze detection analysis, or in addition to gaze detection analysis. As described above, the presence detector 222 can determine if a person exhibits emotions that generally indicate interest, such as smiling, or can determine a degree to which a person exhibits emotions that correspond to an annotated set of expected emotions that correspond to the presentation. The image interaction analyzer 224 can calculate an image interaction score based on such emotional indicators, such as by adding points directly to an image interaction score when the emotional indicators indicate interest, or by weighting interaction points assigned based on gaze analysis based on emotional indicators. In some implementations, the presence detector 222 can detect a change in an imaged size of a person's head, indicating that they are leaning in toward the camera 216 and are expressing interest, and the image interaction analyzer 224 can calculate an image interaction score based on a detected change in imaged head size, such as by adding points to an image interaction score. The interaction analysis server 204 calculate an interaction score based on any of these factors individually or in combination, and in addition to or alternatively to other factors indicative of an attention level.

In some implementations, the facial recognition system 232 can include one or more applications, services, routines, servers, daemons, or other executable logics for identifying a person captured in an image. The image interaction score calculator can include one or more applications for matching a face detected by the presence detector 222 to a gallery of faces stored in the memory of, or accessible to, the interaction analysis server 204. The facial recognition system 232 can further identify a user identifier associated with the face from the gallery, such as a client device identifier or a user account identifier. The facial recognition system 232 can provide the user identifier that corresponds to the detected face to the client device interaction analyzer 234.

In some implementations, the facial recognition system 232 can include a face matching application. The facial recognition system 232 can include one or more same applications as the presence detector 222, such as a facial analysis application, and in some implementations, the presence detector 222 can perform one, some or all of the functions of the facial recognition system 232. The face matching application can detect similarities between an imaged face detected by the presence detector 222 and a face in a gallery of faces. The face matching application can match a calculated hash value of the face with a hash value of a second image from a plurality of hash values, the second image associated with the user identifier. The faces may be match based on facial landmark analysis, described above. The faces may be determined to match based on similar relationships between facial landmarks (e.g. distances between facial landmarks that include the corners of the mouth, the eyes, and the nose), and/or based on other facial features.

In some implementations, the facial recognition system 232 can identify a user identifier associated with the face from the gallery, such as a client device identifier or a user account identifier. The gallery of faces and the associated user identifier can be stored in the memory 220 of the interaction analysis server 204, or can be accessible to the interaction analysis server 204. The gallery of faces and associated user identifiers may have been acquired from a voluntary participant in a research program, or from an audience member at a presentation who volunteers to participate in an interaction analysis process. Part of the participation may involve providing or allowing access to an image of the person's face, and/or an identification of a user identifier, such as a client device identifier or a user account identifier (which can be obtained from a person signing up for the program using a web browsing application that is signed in to the user account). The gallery of faces and associated user identifiers can be obtained in other any appropriate manner.

In some implementations, the facial recognition system 232 can map images, such as images that include a face, to an embedded space, such as a compact Euclidean space where distances directly correspond to a measure of face similarity. A mapped image may be an embedded image represented by a vector in the embedded Euclidean space. The facial recognition system 232 can compare two images and can identify a matching face included in each image by mapping both images to the embedded space, measuring a distance between their embedded space representations, and determining that the measured distance is below a predetermined similarity threshold.

In some implementations, the client device interaction analyzer 234 can include one or more applications, services, routines, servers, daemons, or other executable logics for calculating a client device interaction score. The client device interaction analyzer 234 can include a client device information retriever 236 and a client device interaction score calculator 238. The client device interaction analyzer 234 can calculate a client device interaction score based on information related to a person's use of a client device. The client device information might correspond to content of the presentation, which can indicate that a user of the client device was paying attention to the presentation. The client device interaction analyzer 234 can calculate a client device interaction score for the user based on any of a browsing history, search queries, or social media activity.

In some implementations, the client device information retriever 236 can include one or more applications, services, routines, servers, daemons, or other executable logics for retrieving client device information related to a person captured in an image. The client device information retriever 236 can retrieve information corresponding to a user identifier, the user identifier identified by the facial recognition system 232 as associated with person captured in an image generated by the imaging system 202. The client device information can be stored locally in the memory 220 of the interaction analysis server 204 or can be accessible to the client device information retriever 236 via the network 208 from an external server. The client device information can be to any information that relates to a use of one or more client devices. The client device information can be specific to one client device (e.g. can be associated with a single client device identifier), or can be associated with a user account (which in turn can be associated with one or more client device identifiers). The client device information can correspond to a time period in which a presentation was displayed, and/or a time period for which images were captured by the imaging system 202. The client device information can also include information corresponding to a period prior to and/or subsequent to the time period in which the presentation was displayed. This can be useful because a person might indicate interest in a presentation by using a client device to access or generate content related to the content of the presentation sometime before the presentation (e.g. to determine a show time of the presentation, or to get caught up on a story line of the presentation), or sometime after the presentation (e.g. to search for more information about the content of the presentation or to post on social media about the presentation). The client device information can include client device location information, such as GPS location. In some implementations, the client device interaction analyzer can assign points to a client device interaction score based on a GPS location corresponding to content of the presentation.

In some implementations, the client device interaction score calculator 238 can include one or more applications, services, routines, servers, daemons, or other executable logics for calculating a client device interaction score based on the client device information retrieved by the client device information retriever 236. The client device interaction score calculator can calculate a score based on a correspondence between the content of the presentation and the client device information. In some implementations, the presentation may be associated with categories that correspond to content of the presentation. The presentation may be an Olympic tennis match displayed on a TV, and the presentation may be associated with the categories of "Olympics," "sports," and "tennis." The presentation may be associated with any number of categories, and in some implementations, the categories may be weighted to reflect how closely the category corresponds to the content of the presentation.

In some implementations, the client device interaction score calculator 238 can calculate a client device interaction score based on a retrieved browsing history. The browsing history can include a list of websites accessed by the client device during the time period corresponding to the presentation. The websites can be associated with categories related to the content of the websites. The client device interaction score calculator 238 can assign points to a client device interaction score based on a correspondence between the categories associated with the presentation and the categories associated with a website in the list of websites. For each website visited that is associated with the category "sports," the client device interaction score calculator 238 can assign points to the client device interaction score based on that category matching one of the categories associated with the presentation. The number of points can be weighted based on a weighting of the categories of the presentation: if the content of presentation only tangentially involves sports, the associated sports category might have a low weight, whereas if the content of the presentation is closely tied to sports, the associated sports category might have a high weight. The client device interaction score calculator 238 can assign points to a client device interaction score based on the browsing history in this manner or in any appropriate manner, in combination or individually.

In some implementations, the client device interaction score calculator 238 can calculate a client device interaction score based on one or more retrieved search queries that may have been searched for in a time period corresponding to the display of the presentation. The content of the presentation can be associated with one or more keywords (or key terms) such as "Paris Masters," and "tennis." The client device interaction score calculator 238 can assign points to a client device interaction score based on semantic similarities between search query terms and the content keywords.

The client device interaction score calculator 238 can perform a semantic tree analysis that assigns points based on a semantic tree "distance" between the keywords and the search query terms. A semantic tree can include a hierarchical structure of nodes, each node corresponding to a word. The nodes can be connected such that words that are "higher" in the semantic tree describe a general category that includes the more specific category that is described by the words associated with nodes "lower" in the semantic tree. A node might be associated with the word "sports," and lower nodes may be connected to this node that are associated with the words "tennis," "hockey," and "basketball" respectively. The node associated with "tennis" may be connected to even lower nodes, each associated with the terms "Wimbledon" and "Paris Masters." The client device interaction score calculator 238 can identify both a keyword associated with the presentation and a search query term in the semantic tree, and can count a number of "branches" (e.g. node connections) that lie between the keyword and the search query term. Continuing the above explanation, if a search query included the term "Wimbledon," the client device interaction score calculator 238 may determine that the semantic distance between the search term "Wimbledon" and the keyword "Paris Masters" is equal to two (one connection between "Wimbledon" and "tennis," and one connection between "tennis" and "Paris Masters"). The client device interaction score calculator 238 can determine a semantic distance between each search query term and each keyword associated with the presentation, and can calculate a client device interaction score based on those semantic distances. An implementation of this process is described in more detail below with respect to FIG. 3.

In some implementations, the client device interaction score calculator 238 can calculate a client device interaction score based on social media activity. The presentation may be associated with keywords, as described above, and/or may be associated with one or more social media pages. The client device interaction score calculator 238 can assign points to a client device interaction score based on the retrieved client device information indicating that one of the associated social media pages was visited during a time period corresponding to the presentation, and/or based on a semantic similarity between (i) terms used in a social media post made during the time period corresponding to the presentation, and (ii) the presentation keywords.

Referring to the client device 206 in more detail, the client device 206 can include a display 246. The display 246 may comprise a liquid crystal display (LCD), plasma display, light-emitting diode (LED) display, electrostatic (eInk) display, thermochroic display, cathode ray tube (CRT) display, or any other type and form of display device. The display 246 may be internal to client device 206, or external (e.g. a separate monitor, a wearable display such as a virtual reality or augmented reality display, etc.). In some implementations, the display 246 can be a touch display, such as a touch screen configured to receive tactile input and to convert the input to a signal.

The client device 206 can further include one or more data processors 240 configured to execute instructions stored in a memory 242 to perform one or more operations described herein. The memory 242 may be one or more memory devices. In some implementations, the processor 240 and the memory 242 of the client device 206 may form a processing module. The processor 240 may include a microprocessor, an application-specific integrated circuit (ASIC), a field-programmable gate array (FPGA), etc., or combinations thereof. The memory 242 may include, but is not limited to, electronic, optical, magnetic, or any other storage or transmission device capable of providing processor with program instructions. The memory 242 may include a floppy disk, compact disc read-only memory (CD-ROM), digital versatile disc (DVD), magnetic disk, memory chip, read-only memory (ROM), random-access memory (RAM), Electrically Erasable Programmable Read-Only Memory (EEPROM), erasable programmable read only memory (EPROM), flash memory, optical media, or any other suitable memory from which processor can read instructions. The instructions may include code from any suitable computer programming language such as, but not limited to, C, C++, C#, Java®, JavaScript®, Perl®, HTML, XML, Python®, and Visual Basic®.

In some implementations, the client device 206 may include one or more applications, services, routines, servers, daemons, or other executable logics, including the application 244. The application 244 can be an application for accessing or generating content online, such as a web browser or a social media application. The application 244 can generate client device information that may be retrieved by the client device information retriever 236 as part of a process of calculating a client device interaction score.

Figure 3:
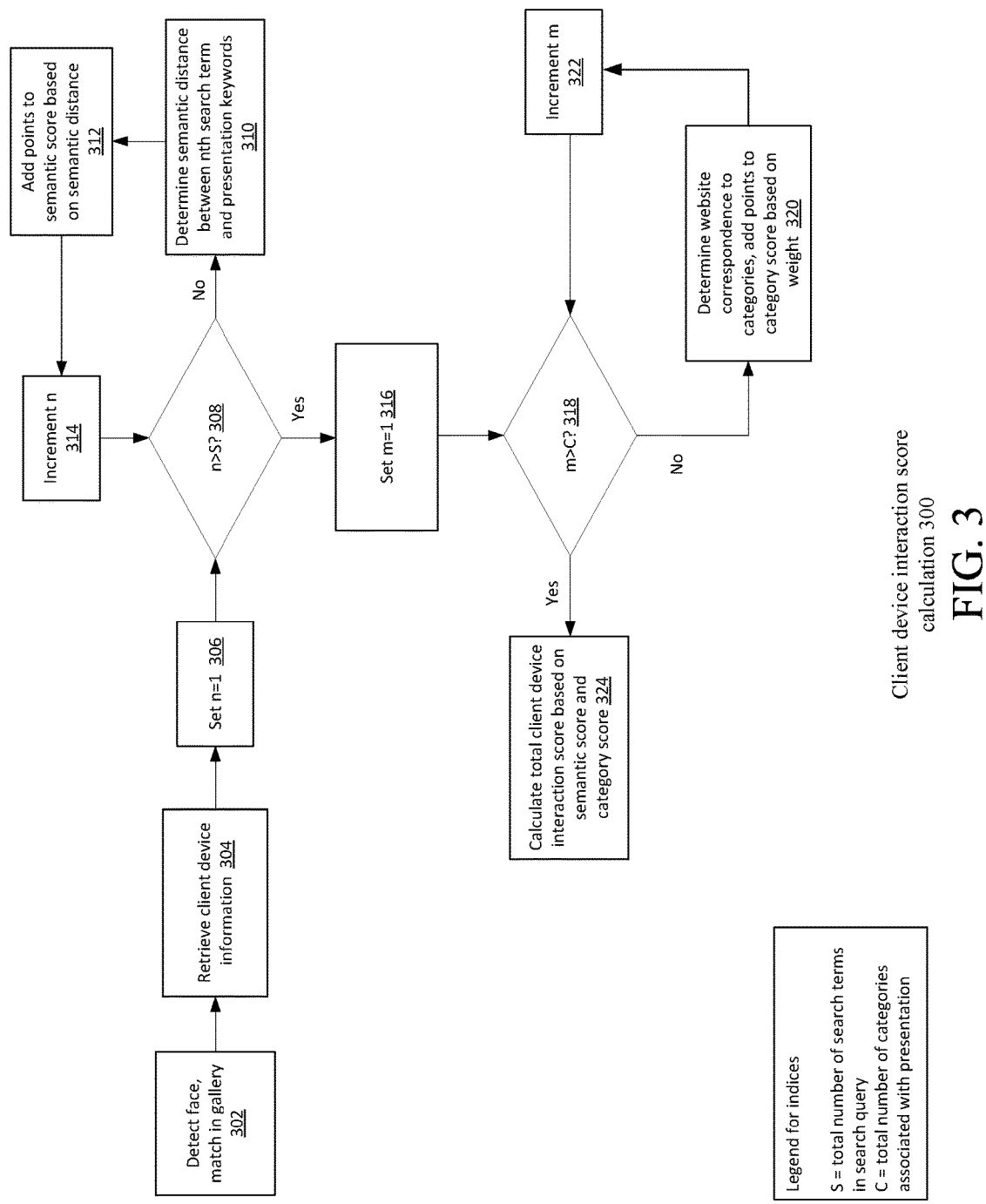
FIG. 3 is a flowchart depicting some implementations of a method of calculating a client device interaction score.

FIG. 3 depicts some implementations of a method of calculating a client device interaction score. Specifically, the depicted flowchart details a client device interaction score calculation 300 ("calculation 300"). In some implementations, the calculation 300 can be performed by the interaction analysis server 204. The calculation 300 can include steps 302-324. Generally, at step 302, the presence detector 222 can detect a face captured in an image of an audience of a presentation. The facial recognition system 232 can match the detected face to a face in a gallery of faces. At step 304, the client device information retriever 236 can retrieve client device information corresponding to a period of time of display of the presentation. At step 306 and 308, the client device interaction score calculator 238 can set a value of an index n (which can keep track of which search term of a plurality of search terms is being analyzed) to 1, and can determine if n is greater than S, the total number of search terms in a search query. If the client device interaction score calculator 238 determines that the index value n is less than or equal to S, the client device interaction score calculator 238 can proceed to step 310, and can determine a semantic distance between the nth search term and presentation keywords. At step 312, the client device interaction score calculator 238 can add points to a semantic score based on the semantic distance. At step 314, the client device interaction score calculator 238 can increment the index n and can return to step 308.

At to step 308, if the client device interaction score calculator 238 can determine that the index value n is less than or equal to S, the client device interaction score calculator 238 can proceed to step 316. At step 316, the client device interaction score calculator 238 can set the index m (which tracks which category associated with the presentation is being analyzed), and at step 318, the client device interaction score calculator 238 can determine whether the index value m is greater than C, the total number of categories associated with the presentation. If the client device interaction score calculator 238 determines that the index value m is less than or equal to C, the client device interaction score calculator 238 can proceed to step 320, and can add category points to a category score based on an mth category weight. At step 322, the client device interaction score calculator 238 can increment m, and can return to step 318. At step 318, if the client device interaction score calculator 238 determines that m is greater than C, the client device interaction score calculator 238 can proceed to step 324, and can calculate a total client device interaction score.

Referring now to steps 302-324 in more detail, in some implementations, at step 302, the presence detector 222 can detect a face captured in an image of an audience of a presentation. The imaging system 202 can capture a plurality of images of an audience during a display of a presentation. The imaging system 202 can transmit the images to the interaction analysis server 204, and the presence detector 222 can detect a face that appears in a plurality of the received images, using any of the face detection techniques described above. Furthermore, at step 302, the facial recognition system 232 can match the detected face to a face in a gallery of faces, using face matching techniques, such as facial landmark based techniques. The gallery of faces can include a plurality of faces of people who have volunteered to participate in an interaction level research plan, and the faces in the gallery can be associated with a client device identifier. The interaction analysis server 204 can then proceed to step 304.

In some implementations, at step 304, the client device information retriever 236 can retrieve client device information associated with a client device identifier that corresponds to the identified face in the gallery of faces. The client device information can correspond to the client device 206, and can be retrieved from a local data store or from an external server. The client device information can include a plurality of search queries executed by a web browser application 244 installed on the client device. The client device information can further include a browsing history of the application 244. Both the search queries and the browsing history can correspond to the period of time in which the presentation was displayed. The interaction analysis server 204 can then proceed to step 306.

In some implementations, at step 306, the client device interaction score calculator 238 can set value of an index n to 1. The index n can run from an initial value of 1 to a value of S, where S is a total number of individual search terms included in the search queries retrieved by the client device information retriever 236. Generally, in steps 310-314, the client device interaction score calculator 238 can perform operations and analysis involving the nth search term of the search terms included in the search queries. After setting the index n to an initial value of 1, the client device interaction score calculator 238 can proceed to step 308.

In some implementations, at step 308, the client device interaction score calculator 238 can compare the index value n to the total number of search terms S. Comparing the index value to the total number of search terms may comprise a bitwise comparison of data strings (e.g. an XOR with a result of 0 indicating the index is equal to the threshold); calculating a difference between the total number of search terms and the index and determining if the result is negative, positive, or zero; or any other such method. This may help determine whether all S of the search terms have been processed in the interaction score calculation 300. If the index value n is greater than S, the client device interaction score calculator 238 can proceed to step 316. Otherwise, the client device interaction score calculator 238 can proceed to step 310.

In some implementations, at step 310, the client device interaction score calculator 238 can determine a semantic distance between the nth search term and keywords associated with the presentation (presentation keywords). The client device interaction score calculator 238 can determine a semantic distance between the nth search term and each presentation keyword. The client device interaction score calculator 238 can then proceed to step 312, and can add points to an overall semantic score based on the determined semantic distances. The client device interaction score calculator 238 can add points equal to the shortest semantic distance of the determined semantic distances, or can add points equal to an average of a predetermined number of shortest semantic distances. The client device interaction score calculator 238 can then proceed to step 314.

In some implementations, at step 314, the client device interaction score calculator 238 can increment n, indicating that the nth search term has been processed and analyzed, and the client device interaction score calculator 238 can then proceed to step 308. At step 308, as described above, if the client device interaction score calculator 238 determines that the index value n is greater than S, the client device interaction score calculator 238 can proceed to step 316.

In some implementations, at step 316, the client device interaction score calculator 238 the client device interaction score calculator 238 can set value of an index m to 1. The index m can run from an initial value of 1 to a value of C, where C is a total number of categories associated with the presentation. Generally, in steps 318-322, the client device interaction score calculator 238 can perform operations and analysis involving the mth category of the categories associated with the presentation. After setting the index m to an initial value of 1, the client device interaction score calculator 238 can proceed to step 318.

In some implementations, at step 318, the client device interaction score calculator 238 can compare the index value m to the total number of categories C. Comparing the index value to the total number of categories may comprise a bitwise comparison of data strings (e.g. an XOR with a result of 0 indicating the index is equal to the threshold); calculating a difference between the total number of categories and the index and determining if the result is negative, positive, or zero; or any other such method. This may help determine whether all C of the categories have been processed in the interaction score calculation 300. If the index value m is greater than C, the client device interaction score calculator 238 can proceed to step 324. Otherwise, the client device interaction score calculator 238 can proceed to step 320.

In some implementations, at step 320, the client device interaction score calculator 238 can add points to a category score based on a correspondence between the websites of the retrieved browsing history and the categories associated with the presentation. The websites of the retrieved browsing history may themselves be associated with categories, such as "sports," "news," or "shopping". If any of those categories, or keywords associated with those categories, match the categories associated with the presentation, the client device interaction score calculator 238 may add points to the category score. The categories associated with the presentation may be weighted. A specific category may be more heavily weighted than a general category, such that if the client device interaction score calculator 238 matches a website category with the specific category, more points are added to the category score than if the client device interaction score calculator 238 matches a website category with the general category. The client device interaction score calculator 238 can the proceed to step 322.

In some implementations, at step 322, the client device interaction score calculator 238 can increment the index value m, and can then proceed to step 318. At step 318, as discussed above, the client device interaction score calculator 238 can compare the index value m to C, and if the client device interaction score calculator 238 determines that m is greater than C, the client device interaction score calculator 238 can proceed to step 324.

In some implementations, at step 324, the client device interaction score calculator 238 can calculate a total client device interaction score based on the semantic score and the category score. The total client device interaction score can serve as an indicator of a level of interest the person identified by the facial recognition system 232 exhibited for the presentation. The client device interaction score calculator 238 may further calculate a total interaction score based on the total client device interaction score and an image interaction score. A total interaction score calculated in this manner can be a better measure of a person's attention level than an interaction score based solely on gaze analysis.

FIG. 4 depicts some implementations of a method of calculating an interaction score with reduced use of computer resources 400. Generally, the method can involve performing an initial image interaction analysis based on gaze detection and, in cases where a high level of attention is detected, proceeding to perform a full image interaction analysis. In cases where a low level of attention is detected, both image interaction analysis and client device interaction analysis can be performed. This can help conserve computer resources, such as bandwidth (used in retrieving client device information) and memory in situations where an initial gaze analysis reveals that the person being analyzed was often looking at the presentation throughout the presentation and thus, presumably, was either not looking at and/or using a client device, or was looking at and/or using the client device for a minimal amount of time.

In some implementations, the depicted method can be performed by the interaction analysis server 204. The method 400 can include steps 402-420. Generally, at step 402, the presence detector 222 can detect a face in an image. At step 404, the facial recognition system 232 can determine that the detected face is present in P images. At step 406, the image interaction analyzer 224 can set an index n (which can track which of the P images is being analyzed) to 1, and at step 408 the image interaction analyzer 224 can compare n to P. If the image interaction analyzer 224 determines that n is greater than P, the image interaction analyzer 224 can proceed to step 416. Otherwise, the image interaction analyzer 224 can proceed to step 410. At step 410, the image interaction analyzer 224 can perform gaze analysis and can determine whether the detected person is looking at the presentation in the nth image. If the image interaction analyzer 224 determines that the person is looking at the presentation, the image interaction analyzer 224 can increment an index k (which counts the number of pictures in which the person is looking at the presentation) and can proceed to step 414. Otherwise, the image interaction analyzer 224 can proceed directly to step 414. At step 414, the image interaction analyzer 224 can increment the index n and can proceed to step 408.

In some implementations, as discussed above, at step 408, the image interaction analyzer 224 can determine that the value n is larger than P, and the image interaction analyzer 224 can proceed to step 416. At step 416, the image interaction analyzer 224 can determine whether the ratio k/P is larger than a predetermined number T. If the image interaction analyzer 224 determines that k/P is larger than T, the interaction analysis server 204 can proceed to step 418, and can implement both image interaction analysis and client device interaction analysis. Otherwise, the interaction analysis server 204 can proceed to step 420, and can implement only image interaction analysis.

Referring now to steps 402-420 in more detail, in some implementations, at step 402 the presence detector 222 can detect a face captured in an image of an audience of a presentation. The imaging system 202 can capture a plurality of images of an audience during a display of a presentation. The imaging system 202 can transmit the images to the interaction analysis server 204, and the presence detector 222 can detect a face that appears in a plurality of the received images, using any of the face detection techniques described above. The presence detector 222 can analyze all of the plurality of images and can detect any faces that appear in those images. The interaction analysis server 204 can then proceed to step 404.

In some implementations, at step 404 the facial recognition system 232 can identify a person whose face appears in P different images of the images of the audience captured during the presentation. The facial recognition system can use face matching techniques to match a face detected in a first image of the plurality of images with a face detected in a second image of the plurality of images. The facial recognition system 232 can thereby determine a number P, P being a number of images in which the person of interest appears. The interaction analysis server 204 can then proceed to step 406.

In some implementations, at step 406, the image interaction analyzer 224 can set value of an index n to 1. The index n can run from an initial value of 1 to a value of P, where P is a total number of images in which the face of interest appears. Generally, in steps 410-414, the image interaction analyzer 224 can perform operations and analysis involving the nth image that includes the person of interest. After setting the index n to an initial value of 1, the image interaction analyzer 224 can proceed to step 408.

In some implementations, at step 408 the image interaction analyzer 224 can compare the index value n to the total number of images in which the person of interest appears P. Comparing the index value to the total number of images may comprise a bitwise comparison of data strings (e.g. an XOR with a result of 0 indicating the index is equal to the threshold); calculating a difference between the total number of images and the index and determining if the result is negative, positive, or zero; or any other such method. This may help determine whether all P of the images have been processed in the method for calculating an interaction score 400. If the index value n is greater than P, the image interaction analyzer 224 can proceed to step 416. Otherwise, the image interaction analyzer 224 can proceed to step 410.

In some implementations, at step 410, the image interaction analyzer 224 can perform gaze analysis on the nth picture, and can determine whether the person of interest is looking at the presentation. The gaze analysis and the determination can be performed in any manner described above. If the image interaction analyzer 224 determines that the person is looking at the presentation in the nth image, the image interaction analyzer 224 can proceed to step 412, can increment the index k (which can track a number of images in which the person is looking at the presentation), and can proceed to step 414. Otherwise, the image interaction analyzer 224 can proceed directly to step 414.

In some implementations, at step 414, the image interaction analyzer 224 can increment the index n and can proceed to step 408. At step 408, as described above, the image interaction analyzer 224 can determine whether the index value n is greater than P. If the image interaction analyzer 224 determines that the index value n is greater than P, the image interaction analyzer 224 can proceed to step 416.

In some implementations, at step 416 the image interaction analyzer 224 can determine whether the ratio k/P is greater than a predetermined image attention threshold T. The ratio k/P corresponds to the percentage of images in which the person of interest is looking at the presentation, out of the total number of images in which the person of interest appears. Step 416 can serve as a filtering mechanism to conserve computer resources in situations where the person of interest is determined to be exhibiting a high level of attention based on image analysis alone, and in which client device interaction analysis may be unnecessary. At step 416, if the image interaction analyzer 224 determines that k/P is greater than T, the image interaction analyzer 224 can proceed to step 420 and can perform only image interaction analysis, thus conserving computer resources. Otherwise, the interaction analysis server 204 can proceed to step 418, and can implement both image interaction analysis and client device interaction analysis.

Accordingly, the systems and methods discussed herein provide implementations for reducing download requirements for display of content, potentially improving bandwidth consumption and reducing inter-device communications, improving battery life of client devices by retrieving data over more efficient and higher speed interfaces, providing better compliance with service provider policies or reducing costs (e.g. by using high bandwidth, low cost primary connections, rather than more expensive secondary connections, etc.).

In a first aspect, the present disclosure is directed to a method of dynamically scoring implicit interactions. The method can include receiving, by an interaction analysis server from an imaging system, a plurality of images of an environment captured in a period of time corresponding to display of a presentation, retrieving, by the interaction analysis server, content information corresponding to content of the presentation, and identifying, by a presence detector of the interaction analysis server, that a face appears in at least one image of the plurality of images. The method can further include matching, by a facial recognition system of the interaction analysis server, the face with a user identifier, retrieving, by a client device information retriever, client device information associated with the user identifier and corresponding to the period of time, and calculating, by a client device interaction score calculator, a client device interaction score based on one or more correspondences between the client device information and the content information.

In a second aspect, the present disclosure is directed to a server for dynamically scoring implicit interactions. The server can include a processor executing a presence detector, a facial recognition system, a client device information retriever, and a client device interaction score calculator, and a memory. The server can be configured to receive, from an imaging system, a plurality of images of an environment captured in a period of time corresponding to display of a presentation, and to retrieve content information corresponding to content of the presentation. The presence detector can be configured to identify that a face appears in at least one image of the plurality of images. The facial recognition system can be configured to match the face with a user identifier. The client device information retriever can be configured to retrieve client device information associated with the user identifier and corresponding to the period of time. The client device interaction score calculator can be configured to calculate a client device interaction score based on one or more correspondences between the client device information and the content information.

While this specification contains many specific implementation details, these should not be construed as limitations on the scope of what may be claimed, but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated in a single software product or packaged into multiple software products embodied on tangible media. References to "or" may be construed as inclusive so that any terms described using "or" may indicate any of a single, more than one, and all of the described terms.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The claims should not be read as limited to the described order or elements unless stated to that effect. It should be understood that various changes in form and detail may be made by one of ordinary skill in the art without departing from the spirit and scope of the appended claims. All implementations that come within the spirit and scope of the following claims and equivalents thereto are claimed.

What is claimed is:

1. A method of dynamically scoring implicit interactions, comprising:
receiving, by an interaction analysis server from an imaging system, a plurality of images of an environment captured in a period of time corresponding to display of a presentation;
retrieving, by the interaction analysis server, content information corresponding to content of the presentation;
identifying, by a presence detector of the interaction analysis server, that a face appears in at least one image of the plurality of images;
determining, by a gaze analyzer, that in at least one other image of the plurality of images, the face is gazing away from the display of the presentation;

determining, responsive to determining that in the at least one other image of the plurality of images the face is gazing away from the display of the presentation, a client device interaction score by:
matching, by a facial recognition system of the interaction analysis server, the face with a user identifier;
retrieving, by a client device information retriever, client device information associated with the user identifier and corresponding to the period of time; and
calculating, by a client device interaction score calculator, the client device interaction score based on one or more correspondences between the client device information and the content information;
calculating, by an image interaction analyzer, an image interaction score based on one or more gaze analysis techniques;
calculating, by the interaction analysis server, a total interaction score based on the image interaction score and the client device interaction score, wherein the client device interaction score positively contributes to the total interaction score.

2. The method of claim 1, wherein matching the face with the user identifier comprises comparing an embedded representation of the face with an embedded representation of a second image, the second image associated with the user identifier.

3. The method of claim 1, wherein:
the content information includes keywords,
the client device information includes a search query including a search term, and
calculating the client device interaction score further comprises performing, by the client device interaction score calculator, semantic tree analysis of the keywords and the search term.

4. The method of claim 1, wherein calculating an image interaction score is further based on eye pixel analysis.

5. The method of claim 1, further comprising:
detecting, by the presence detector, facial features corresponding to an emotion predetermined to be indicative of interest in the presentation; and
wherein calculating the image interaction score further comprises increasing the image interaction score responsive to the detection of the facial features corresponding to the emotion.

6. The method of claim 1, wherein:
the content information includes one or more categories;
the client device information includes a browsing history including a list of visited websites, each website associated with one or more categories; and
wherein calculating the client device interaction score further comprises increasing the client device interaction score responsive to detection of a correspondence between a category of the content information and a category of a website of the list of visited websites.

7. The method of claim 1, wherein the period of time corresponding to display of the presentation includes a first period of time in which the presentation was displayed and a second period of time prior to or subsequent to the first period of time in which the presentation was displayed.

8. The method of claim 1, wherein the user identifier is at least one of: an account identifier or a device identifier.

9. The method of claim 1, wherein calculating the image interaction score is performed prior to calculating the client device interaction score, and calculating the client device interaction score is performed responsive to the image interaction analyzer determining that the image interaction score is below a predetermined threshold.

10. A server for dynamically scoring implicit interactions, comprising:
a processor; and
a memory;
wherein the processor is configured to:
receive, from an imaging system, a plurality of images of an environment captured in a period of time corresponding to display of a presentation,
retrieve content information corresponding to content of the presentation,
identify, using a presence detector, that a face appears in at least one image of the plurality of images,
determine, using a gaze analyzer, that in at least one other image of the plurality of images, the face is gazing away from the display of the presentation,
determine a client device interaction score responsive to the determination that in the at least one other image of the plurality of images the face is gazing away from the display of the presentation,
match, using a facial recognition system, the face with a user identifier responsive to the determination that in the at least one other image of the plurality of images the face is gazing away from the display of the presentation,
retrieve client device information associated with the user identifier and corresponding to the period of time,
calculate, using a client device interaction score calculator, the client device interaction score based on one or more correspondences between the client device information and the content information,
calculate, using an image interaction analyzer, an image interaction score based on one or more gaze analysis techniques, and
calculate a total interaction score based on the image interaction score and the client device interaction score, the client device interaction score positively contributing to the total interaction score.

11. The server of claim 10, wherein the facial recognition system is further configured to compare an embedded representation of the face with an embedded representation of a second image, the second image associated with the user identifier.

12. The server of claim 10, wherein:
the content information includes keywords,
the client device information includes a search query including a search term, and
the client device interaction score calculator is further configured to perform semantic tree analysis of the keywords and the search term.

13. The server of claim 10, wherein the image interaction analyzer is further configured to calculate an image interaction score based on eye pixel analysis.

14. The server of claim 10, wherein:
the presence detector is further configured to detect facial features corresponding to an emotion predetermined to be indicative of interest in the presentation, and
the image interaction analyzer is further configured to increase the image interaction score responsive to the detection of the facial features corresponding to the emotion.

15. The server of claim 10, wherein:
the content information includes one or more categories,
the client device information includes a browsing history including a list of visited websites, each website associated with one or more categories, and
the client device interaction score calculator is further configured to increase the client device interaction score responsive to detection of a correspondence between a category of the content information and a category of a website of the list of visited websites.

16. The server of claim 10, wherein the period of time corresponding to display of the presentation includes a first period of time in which the presentation was displayed and a second period of time prior to or subsequent to the first period of time in which the presentation was displayed.

17. The server of claim 10, wherein the user identifier is at least one of: an account identifier or a device identifier.

18. The server of claim 10, wherein
the image interaction score calculator is further configured to:
calculate the image interaction score prior to the client device interaction score calculator calculating the client device interaction score, and
determine that the image interaction score is below a predetermined threshold, and
the client device interaction score calculator is further configured to calculate the client device interaction score responsive to the image interaction analyzer determining that the image interaction score is below a predetermined threshold.

19. A method of dynamically scoring implicit interactions, comprising:
receiving, by an interaction analysis server from an imaging system, a plurality of images of an environment captured in a period of time corresponding to display of a presentation;
retrieving, by the interaction analysis server, content information corresponding to content of the presentation;
identifying, by a presence detector of the interaction analysis server, that a face appears in at least one image of the plurality of images;
matching, by a facial recognition system of the interaction analysis server, the face with a user identifier;
retrieving, by a client device information retriever, client device information associated with the user identifier and corresponding to the period of time; and
calculating, by a client device interaction score calculator, a client device interaction score based on one or more correspondences between the client device information and the content information, wherein:
the content information includes one or more categories;
the client device information includes a browsing history including a list of visited websites, each website associated with one or more categories; and
calculating the client device interaction score further comprises increasing the client device interaction score responsive to detection of a correspondence between a category of the content information and a category of a website of the list of visited websites.

* * * * *